US010089094B2

(12) United States Patent
Wang et al.

(10) Patent No.: US 10,089,094 B2
(45) Date of Patent: Oct. 2, 2018

(54) FILE SHARING METHOD, DEVICE AND MOBILE EQUIPMENT

(71) Applicants: Zhuhai Kingsoft Online Game Technology Co., Ltd., Zhuhai (CN); Chengdu Kingsoft Digital Entertainment Co., Ltd., Chengdu (CN)

(72) Inventors: Quanguo Wang, Zhuhai (CN); Xinchun Wu, Chengdu (CN)

(73) Assignees: Zhuhai Kingsoft Online Game Technology Co., Ltd., Zhuhai (CN); Chengdu Kingsoft Digital Entertainment Co., Ltd., Chengdu (CN)

( * ) Notice: Subject to any disclaimer, the term of this patent is extended or adjusted under 35 U.S.C. 154(b) by 388 days.

(21) Appl. No.: 14/442,486

(22) PCT Filed: May 20, 2014

(86) PCT No.: PCT/CN2014/077872
§ 371 (c)(1),
(2) Date: May 13, 2015

(87) PCT Pub. No.: WO2015/070582
PCT Pub. Date: May 21, 2015

(65) Prior Publication Data

US 2016/0274881 A1 Sep. 22, 2016

(30) Foreign Application Priority Data

Nov. 18, 2013 (CN) .......................... 2013 1 0577442

(51) Int. Cl.
*G06F 15/167* (2006.01)
*G06F 8/61* (2018.01)
(Continued)

(52) U.S. Cl.
CPC ................ *G06F 8/61* (2013.01); *G06F 9/452* (2018.02); *H04L 61/2007* (2013.01);
(Continued)

(58) Field of Classification Search
CPC . H04L 63/0263; H04L 63/0236; H04L 67/02; H04L 61/2007; H04L 67/06; H04L 67/14; G06F 8/61; H04W 84/12
See application file for complete search history.

(56) References Cited

U.S. PATENT DOCUMENTS 7,613,770 B2 11/2009 Li
7,664,861 B2 2/2010 Guntupalli et al.
(Continued)

FOREIGN PATENT DOCUMENTS

CN 101860591 10/2010
CN 102017528 A 4/2011
(Continued)

OTHER PUBLICATIONS

Hunt, [APP] Xender (Share things wirelessly), Nov. 7, 2013; http://forum.xda-developers.com/showthread.php?t=2516256.
(Continued)

*Primary Examiner* — Chris Parry
*Assistant Examiner* — Stephen Houlihan
(74) *Attorney, Agent, or Firm* — Boyle Fredrickson S.C.

(57) ABSTRACT

The present application discloses a file sharing method, device and mobile equipment. The method for file sharing, applicable to a first mobile equipment, comprises: fetching the sharing instruction directed to the file to be shared; performing network connection to a second mobile equipment that requests network sharing after starting the network sharing function of the first mobile equipment; intercepting and redirecting the browser-based network request sent by the second mobile equipment, and using the file to be shared
(Continued)

as the result of the request corresponding to the network request and send it to the second mobile equipment. By using this embodiment, a quick file sharing is achieved without producing any network flow, without installing any software or plug-in having file sharing function in the receiving end of the file to be shared, thereby improving the user experience.

18 Claims, 4 Drawing Sheets

(51) Int. Cl.

| | |
|---|---|
| ***G06F 9/451*** | (2018.01) |
| ***H04L 29/08*** | (2006.01) |
| ***H04L 29/12*** | (2006.01) |
| ***H04W 12/08*** | (2009.01) |
| *H04W 84/12* | (2009.01) |
| *H04L 29/06* | (2006.01) |

(52) U.S. Cl.
CPC .............. *H04L 67/02* (2013.01); *H04L 67/06* (2013.01); *H04L 67/14* (2013.01); *H04L 67/2814* (2013.01); *H04L 67/34* (2013.01); *H04W 12/08* (2013.01); *H04L 63/0236* (2013.01); *H04L 63/0263* (2013.01); *H04W 84/12* (2013.01)

(56) References Cited

U.S. PATENT DOCUMENTS

2006/0173940 A1* 8/2006 Guntupalli .......... H04L 12/1818
2007/0147347 A1* 6/2007 Ristock ................... H04L 67/16 370/352
2007/0282951 A1* 12/2007 Selimis ................... H04L 67/06 709/205
2012/0210166 A1 8/2012 Bonefas et al.
2012/0246226 A1 9/2012 Anandam et al.
2013/0117214 A1* 5/2013 Davis ........................ G06N 5/02 706/46
2014/0068401 A1* 3/2014 Kirigin ............. G06F 17/30884 715/205
2014/0096202 A1* 4/2014 Matsuda ............... H04W 4/008 726/4
2014/0282817 A1* 9/2014 Singer ..................... H04L 63/08 726/1

FOREIGN PATENT DOCUMENTS

| | | |
|---|---|---|
| TW | I406137 | 8/2013 |
| WO | 2009135986 A1 | 11/2009 |

OTHER PUBLICATIONS

Mancinelli, Fabio, Leveraging the Web Platform for Ambient Computing: An Experience, Varlie Issamy and Nikolaos Georgantas, 1st International Workshop on Ad-hoc Ambient Computing (AdhocAmC), Sep. 2008, Sophia Antipolis, France.

Kaizuka, Hiroyuki, Introduction to the Firewall, Fully Understanding of IPTables, Nikkei Linux, Nikkei Business Publications, Inc., Feb. 8, 2008, pp. 119-122.

"Expert of Wireless LAN Intrusion", Japan Hacker, pp. 36-47, Sep. 1, 2010.

"A Safe Method for Executing a Java Service on Linux", Java World, pp. 16-20, Feb. 1, 2004.

* cited by examiner

FILE SHARING METHOD, DEVICE AND MOBILE EQUIPMENT

The present application claims the priority of Chinese patent application NO. 2013105774428, entitled "file sharing method, device and mobile equipment", filed with the SIPO on Nov. 18, 2013, which is incorporated herein by reference in its entirety.

FIELD OF THE INVENTION

The invention relates to the field of data sharing, and particularly, to a file sharing method, device and mobile equipment.

BACKGROUND OF THE INVENTION

With the quick development of science and technology, various mobile equipments gradually enrich and facilitate the life of the people. Due to the advantages of convenience, rapidness and resource saving to process information by mobile equipments, the mobile equipments are becoming an indispensable part for the life or work of the people.

Among others, a user can log into some website through a browser in a mobile equipment, download the installation package of desired application to local mobile equipment, and then install the application. For example, after downloading the installation package of game software named "The First Myth" from an APP website and then installing it in local, a user can start playing the game.

On the other hand, if the user wants to share this application with his friend, he can tell his friend the name and the downloading website of the application, and thus his friend can use a browser to search the website, and then download the installation package of the application. Of course, his friend can also use a mobile equipment to scan the two-dimension code relevant to the application shown in the mobile equipment of the user, and download the installation package of the application.

However, the aforementioned method for file sharing is very troublesome, since it brings inconveniences to the user. For example, after the user recommends software to his friend, it will be difficult for the friend to finish the downloading within a short time; and downloading the software will produce network flow. Moreover, when downloading a file having a larger number of bytes, user usually chooses to download the file when a WLAN network is available so as to save dataflow, but when the network is not available, the file sharing cannot be immediately achieved.

SUMMARY OF THE INVENTION

In view of the aforementioned problems, the embodiments of the invention disclose a file sharing method, device and mobile equipment, for quickly sharing a file without producing network flow, without the need of installing any software or plug-in having the function of file sharing in a shared file receiving end, thereby improving user experience. The technical solution is as follows:

In a first aspect, one embodiment of the invention provides a file sharing method applicable to a first mobile equipment, the method comprising:

fetching a sharing instruction directed to a file to be shared;

performing network connection to a second mobile equipment which requests network sharing after the network sharing function of the first mobile equipment is started;

intercepting and redirecting a browser-based network request sent by the second mobile equipment, and then sending the file to be shared as the result of the request corresponding to the network request to the second mobile equipment.

Preferably, before performing the network connection to the second mobile equipment that requests network sharing, the method further comprises:

starting the network sharing function of the first mobile equipment.

Preferably, during the time when the application is in open state, when an operation sent based on the application for indicating to share file is detected, the sharing instruction directed to the file to be shared is fetched, wherein the file to be shared is the one corresponding to the application.

Preferably, when an operation for indicating to share file is detected, the sharing instruction directed to the file to be shared is fetched;

before sending the file to be shared as the result of the request corresponding to the network request to the second mobile equipment, the method further comprises:

presenting a file selection interface for indicating a user to select the file that needs to be shared, wherein the sharable file(s) stored in the first mobile equipment is/are included in the file selection interface; and using the user-selected file that needs to be shared as the file to be shared.

Preferably, after fetching the sharing instruction directed to the file to be shared, the method further comprises:

fetching a sharing installation webpage of the file to be shared, wherein a download link directed to the file to be shared is included in the sharing installation webpage;

accordingly, sending the file to be shared as the result of the request corresponding to the network request to the second mobile equipment comprising:

sending the sharing installation webpage as the result of the request corresponding to the network request to the second mobile equipment; and after receiving a download request sent by the second mobile equipment which is formed based on the download link of the sharing installation webpage, sending the file to be shared corresponding to a download request to the second mobile equipment.

Preferably, during the time when the application is in open state, when an operation sent based on the application for indicating to share file is detected, the sharing instruction directed to the file to be shared is fetched, wherein the file to be shared is the one corresponding to the application;

accordingly, fetching the sharing installation webpage of the file to be shared comprises:

fetching the sharing installation webpage built in the application in advance, wherein the download link directed to the file to be shared is included in the sharing installation webpage.

Preferably, when an operation indicating to share file is detected, the sharing instruction directed to the file to be shared is fetched;

accordingly, fetching the sharing installation webpage of the file to be shared comprises:

presenting a file selection interface for indicating a user to select a file that needs to be shared, wherein the sharable file(s) stored in the first mobile equipment is/are included in the file selection interface;

using the file selected by the user and needed to be shared as the file to be shared, and generating a sharing installation webpage directed to the file to be shared, wherein the download link directed to the file to be shared is included in the sharing installation webpage.

Preferably, intercepting and redirecting the browser-based network request sent by the second mobile equipment comprises:

intercepting the browser-based network request sent by the second mobile equipment;

judging whether the network request is the preset first network request; and redirecting the network request if it is judged that the network request is the preset first network request.

Preferably, when the current user name of the operation system of the first mobile equipment is the one with administrator authority, the browser-based network request sent by the second mobile equipment is intercepted and redirected by means of setting the rules of iptables in the operation system of the first mobile equipment.

Preferably, the procedure of setting the rules of iptables in the operation system of the first mobile equipment comprises:

adding rules to the iptables of the first mobile equipment that monitor the target first port of the browser-based network request of the second mobile equipment, and redirect the intercepted browser-based network request sent by the second mobile equipment via the first mobile equipment to the preset second port of the first mobile equipment;

accordingly, intercepting and redirecting the browser-based network request sent by the second mobile equipment comprises:

monitoring the target first port of the browser-based network request of the second mobile equipment, and intercepting the browser-based network request sent by the second mobile equipment directed to the first mobile equipment, and then redirecting the intercepted network request to the second port of the first mobile equipment, so as to send the result of the request corresponding to the network request to the second mobile equipment via the second port.

Preferably, when the current user name of the operation system of the first mobile equipment is the one with administrator authority, the browser-based network request sent by the second mobile equipment is intercepted and redirected by means of mounting written kernel module.

Preferably, the procedure of mounting written kernel module comprises:

mounting the kernel module written by using netfilter framework into the operation system kernel of the first mobile equipment to add a hook point in the IP layer of the network framework, wherein, by using the hook point, the network request of the second mobile equipment directed to the first mobile equipment and targeting the preset first port is intercepted, the target IP in the network request can be changed to the IP address of the first mobile equipment, and the target port can be changed to the preset second port of the first mobile equipment;

accordingly, intercepting and redirecting the browser-based network request sent by the second mobile equipment comprises:

by using the hook point, intercepting the browser-based network request sent by the second mobile directed to the first mobile equipment and targeting the first port, changing the target IP address of the network request to the IP address of the first mobile equipment, and changing the target port to the second port of the first mobile equipment, so as to send the result of the request corresponding to the network request to the second mobile equipment via the second port.

Preferably, when the current user name of the operation system of the first mobile equipment is the one without administrator authority, the method further comprises:

after fetching the sharing instruction directed to the file to be shared, presenting a page that includes the access method and the IP address of the first mobile equipment itself, to indicate the user corresponding to the second mobile equipment to input the IP address of the first mobile equipment in the address bar of the browser of the second mobile equipment;

accordingly, intercepting and redirecting the browser-based network request sent by the second mobile equipment comprises:

fetching the browser-based network request of the second mobile equipment via a built-in WEB module in the first mobile equipment.

Preferably, performing the network connection to the second mobile equipment that requests network sharing comprises:

indicating the user to select a sharable second mobile equipment from the second mobile equipments that request network sharing; and performing the network connection to the selected sharable second mobile equipment.

Preferably, after performing the network connection to the second mobile equipment that requests network sharing, the method further comprises:

indicating the user to select a sharable second mobile equipment from the second equipments which are in the state of network connection;

intercepting and redirecting the browser-based network request sent by the second mobile equipment, comprising:

intercepting the browser-based network request sent by the second mobile equipment;

judging whether the second mobile equipment is a sharable second mobile equipment, and if it is, redirecting the browser-based network request sent by the second mobile equipment.

Preferably, the network sharing function of the first mobile equipment comprises at least one function of WLAN hot-spot, Bluetooth network sharing and USB network sharing.

Preferably, starting the network sharing function of the first mobile equipment comprises:

judging whether the function of WLAN hot-spot exists, and if it does, starting the function of WLAN hot-spot;

if it does not, judging whether the function of Bluetooth network sharing exists, if it does, starting the function of Bluetooth network sharing;

if it does not, starting the function of USB network sharing.

Preferably, the file to be shared corresponds to a sharing installation webpage, wherein the sharing installation webpage comprises a download link directed to at least one operation system and pointing to the file to be shared, and each download link points to the file to be shared which is directed to one operation system;

accordingly, sending the file to be shared corresponding to the download request to the second mobile equipment, comprises:

according to the download request, determining a first operation system running in the second mobile equipment; and sending the file to be shared, which corresponds to the download request and is directed to the first operation system, to the second mobile equipment;

or, the shared file corresponding to at least one sharing installation webpage, wherein each sharing installation webpage includes the download link that points to file to be shared and is directed to one operation system;

accordingly, sending the sharing installation webpage as the result of the request corresponding to the network request to the second mobile equipment, comprises:

according to the network request, determining the first operation system running in the second mobile equipment;

sending the sharing installation webpage corresponding to the first operation system as the result of the request corresponding to the network request to the second mobile equipment.

In a second aspect, one embodiment of the invention further provides a file sharing device which is applicable to a first mobile equipment. The file sharing device comprises:

a sharing instruction fetching module, which is used to fetch the sharing instruction directed to the file to be shared;

a network connection module, which is used to perform the network connection to the second mobile equipment that requests network sharing after starting the network sharing function of the first mobile equipment;

a network request processing module, which is used to intercept and redirect the browser-based network request sent by the second mobile equipment; and a processing module of the file to be shared, which is used to send the file to be shared as the result of the request corresponding to the network request to the second mobile equipment.

Preferably, the file sharing device further comprises:

a network sharing function starting module, which is used to start the network sharing function of the first mobile equipment before performing the network connection to the second mobile equipment that requests the network connection.

Preferably, the sharing instruction fetching module comprises:

a first sharing instruction fetching unit, which is used to fetch the sharing instruction directed to the file to be shared when the operation sent based on the application for indicating to share file is detected, during the time when the application is in open state, wherein the file to be shared is the one corresponding to the application.

Preferably, the sharing instruction fetching module comprises:

a second sharing instruction fetching unit, which is used to fetch the sharing instruction directed to the file to be shared when an operation for indicating to share file is detected;

and the device further comprises:

a determining module of the file to be shared, which is used to present a file selection interface indicating the user to select the file that needs to be shared before sending the file to be shared as the result of the request corresponding to the network request to the second mobile equipment, wherein the sharable file(s) stored in the first mobile equipment is/are included in the file selection interface; using the file selected by the user and needed to be shared as the file to be shared.

Preferably, the file sharing device further comprises:

a sharing installation webpage fetching module, which is used to fetch the sharing installation webpage of the file to be shared after the sharing instruction directed to the file to be shared is fetched; wherein the download link pointing to the file to be shared is included in the sharing installation webpage;

accordingly, the processing module of the file to be shared comprises:

a sharing installation webpage sending unit, which is used to send the sharing installation webpage as the result of the request corresponding to the network request to the second mobile equipment; and a processing unit of the file to be shared, which is used to send the file to be shared corresponding to the download request to the second mobile equipment after receiving the download request sent by the second mobile equipment and formed based on the download link of the sharing installation webpage.

Preferably, the sharing instruction fetching module comprises:

a first sharing instruction fetching unit, which is used to fetch the sharing instruction directed to file to be shared when an operation for indicating to share file sent based on the application is detected, during the time when the application is in open state, wherein the file to be shared is the file corresponding to the application;

accordingly, the sharing installation webpage fetching module, comprises:

a first sharing installation webpage fetching unit, which is used to fetch the sharing installation webpage built in the application in advance after fetching the sharing instruction directed to the file to be shared, wherein the download link pointing to the file to be shared is included in the sharing installation webpage.

Preferably, the sharing instruction fetching module comprises:

a second sharing instruction fetching unit, which is used to fetch the sharing instruction directed to the file to be shared when an operation indicating to share file is detected;

accordingly, the sharing installation webpage fetching module comprises:

a second sharing installation webpage fetching unit, which is used to present the file selection interface for indicating the user to select the file to be shared after fetching the sharing instruction directed to the file to be shared, wherein the sharable file(s) stored in the first mobile equipment is/are included in the file selection interface; and after completing the selection of the file to be shared, the sharing installation webpage directed to the file to be shared is generated, wherein the download link pointing to the file to be shared is included in the sharing installation webpage.

Preferably, the network request processing module comprises:

a network request intercepting unit, which is used to intercept the browser-based network request sent by the second mobile equipment;

a judging unit, which is used to judge whether the network request is the preset first network request;

a network request redirecting unit, which is used to redirect the network request if it is judged that the network request is the preset first network request.

Preferably, the network request processing module is used to intercept and redirect the browser-based network request sent by the second mobile equipment by means of setting rules of iptables in the operation system of the first mobile equipment, when the current user name of operation system of the first mobile equipment is the one with administrator authority.

Preferably, the network request processing module is used to intercept and redirect the browser-based network request sent by the second mobile equipment by means of mounting the written kernel module, when the current user name of operation system of the first mobile equipment is the one with administrator authority.

Preferably, the file sharing device further comprises:

a webpage presenting module, which is used to present a webpage that includes the IP address and the access method of the first mobile equipment itself to indicate the user corresponding to the second mobile equipment to input the IP address of the first mobile equipment in the address bar of the browser of the second mobile equipment after fetching the sharing instruction directed to the file to be shared, the network request processing module is used to fetch the browser-based network request of the second mobile equipment via a built-in WEB module in the first mobile equipment, when the current user name of the operation system of the first mobile equipment is the one without administrator authority.

Preferably, the network connection module comprises:

a selection unit, which is used to indicate the user to select a sharable second mobile equipment from the second mobile equipments that request network sharing; and a network connection unit, which is used to perform the network connection to the selected sharable second mobile equipment.

Preferably, the file sharing device further comprises:

a selection module, which is used to indicate the user to select a sharable second mobile equipment from the second mobile equipments which are in state of network connection after performing the network connection to the second mobile equipments that request network sharing;

the network request processing module comprises:

a network request intercepting unit, which is used to intercept the browser-based network request sent by the second mobile equipment; and a network request processing unit, which is used to judge whether the second mobile equipment is a sharable second mobile equipment, and if it is, redirect the browser-based network request sent by the second mobile equipment.

Preferably, the network sharing function of the first mobile equipment comprises at least one function of WLAN hot-spot, Bluetooth network sharing and USB network sharing.

Preferably, the network sharing function starting module is used to judge whether the function of WLAN hot-spot exists, and if it does, start the function of WLAN hot-spot; and if it does not, judge whether the function of Bluetooth network sharing exists, if it does, start the Bluetooth network sharing function; and if it does not, start the function of USB network sharing.

Preferably, the file to be shared corresponds to a sharing installation webpage, wherein the sharing installation webpage includes a download link that points to file to be shared and is directed to at least one operation system, and each download link points to the file to be shared which is directed to one operation system;

the processing unit of the file to be shared comprises:

an operation system determining subunit, which is used to determine the first operation system running in the second mobile equipment according to the download request after receiving the download request sent by the second mobile equipment via the download link of the sharing installation webpage; and a sending subunit of the file to be shared, which is used to send the file to be shared, corresponding to the download request and directed to the first operation system, to the second mobile equipment;

or, the file to be shared corresponds to at least one sharing installation webpage, wherein each sharing installation webpage includes a download link that points to the file to be shared and is directed to one operation system;

the sharing installation webpage sending unit comprising:

an operation system determining subunit, which is used to determine the first operation system running in the second mobile equipment according to the network request; and a sending subunit of sharing installation webpage, which is used to send the sharing installation webpage corresponding to the first operation system as result of the request corresponding to the network request to the second mobile equipment.

In a third aspect, one embodiment of the invention further provides mobile equipment, comprising: any one of the file sharing device provided in the embodiments of the invention.

In this embodiment, there is no need for the second mobile equipment to install any software or plug-in having file sharing function before sharing a file. The first mobile equipment can intercept and redirect the network request sent by the second mobile equipment, and then send the file to be shared to the second mobile equipment as the result of the request corresponding to the network request. Thus, a quick file sharing can be achieved by means of producing no network flow, without installing any software or plug-in having file sharing function in the receiving end of the file to be shared, thereby improving the user experience.

DESCRIPTION OF THE DRAWINGS

For illustrating the embodiments of the invention and the prior art more clearly, the drawings that needs to be used in the embodiments and prior art are briefly described below. Obviously, the drawings described below are only some embodiments of the invention, and for those skilled in the art, other drawings can be obtained according to these drawings without any creative labor.

DETAILED DESCRIPTION

The technical solutions of the invention will be described clearly and completely in combination with the drawings in the embodiments of the present invention. Obviously, the embodiments described below are only a part of the invention, not the entirety thereof. Based on the embodiments in the invention, all the other embodiments obtained by those skilled in the art without any creative labor are all within the protection scope of the invention.

A file sharing method, device and mobile equipment are provided in the invention for the purpose of a quick file sharing without the need of installing any software or plug-in having file sharing function in the receiving end of shared file and producing network flow, thus improving user experience.

A file sharing method provided in the embodiment of the invention is described below.

Among others, the file sharing method provided in the embodiments is applicable to a first mobile equipment with network sharing function, wherein the network sharing function of the first mobile equipment comprises: at least one function of WLAN hot-spot, Bluetooth network sharing and USB network sharing. It can be understood that, in a practical application, the first mobile equipment may be a cell phone, a laptop, a tablet computer, etc.

Moreover, the functional software implementing file sharing method can be a sharing function module built in an application, or exist as a plug-in in an application, or be a client software installed in a first mobile equipment for providing file sharing function. For better understanding, examples are given as below: the first mobile equipment is an iphone installed with the game application of The First Myth, and the installation package of the game application of The First Myth can be saved in a certain folder. When the user wants to recommend the game to a friend and help him install the game application of The First Myth, the installation package of the game application of The First Myth is the file to be shared, wherein the functional software implementing the sharing method of the installation package can be a sharing function module in the game application of The First Myth, or exist as a plug-in in the game application of The First Myth, or it can be another client software for providing file sharing separated from the game application of The First Myth.

Figure 1:
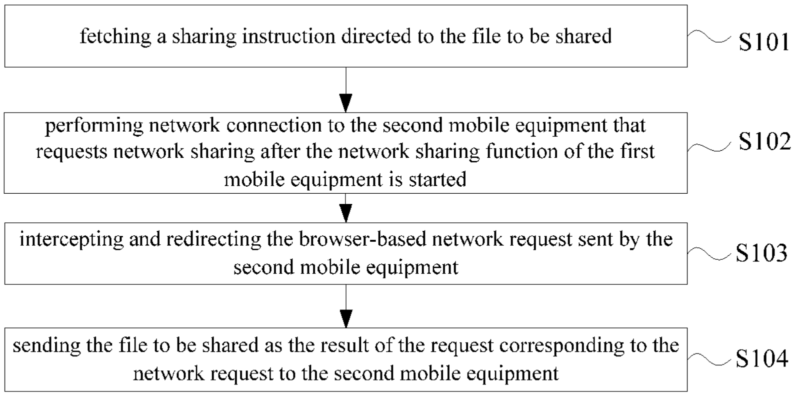
FIG. 1 is the first flow chart of a file sharing method provided in the embodiments of the invention.

As shown in FIG. 1, a file sharing method can comprise:

S101, fetching a sharing instruction directed to the file to be shared, wherein, when a file of a first mobile equipment is required to be shared to a second mobile equipment, the user holding the first mobile equipment can make a specific operation to send a sharing instruction, so that the first mobile equipment can fetch the sharing instruction directed to the file to be shared.

For example, in the case where the functional software implementing file sharing method is a sharing function module built in an application or exist as a plug-in in an application, during the time when the application is in open state, when an operation sent based on the application for indicating to share file is detected, the sharing instruction directed to the file to be shared is fetched, wherein the file to be shared is the one corresponding to the application; for example, after the user holding the first mobile equipment clicks the "one-touch sharing" button displayed on the page of an opened application, the first mobile equipment fetches the sharing instruction directed to the file to be shared, wherein the file to be shared is the installation package corresponding to the application in open state, but is not limited thereto.

For example, in the case where the functional software implementing file sharing method is a client software installed in the first mobile equipment for providing the file sharing function, when an operation for indicating to share file is detected, the sharing instruction directed to the file to be shared is fetched. For example, after the user clicks the "one-touch sharing" button in the client software, the first mobile equipment fetches the sharing instruction directed to file to be shared, but it is not limited thereto.

It is to be noted that, for safety, the button indicating to share file will go down after being pressed, and will bounce up after being pressed again, and the network sharing function of the first mobile equipment is shut off

S102, performing network connection to the second mobile equipment that requests network sharing after the network sharing function of the first mobile equipment is started, wherein after the first mobile equipment starts network sharing function, the user holding the second mobile equipment can scan the first mobile equipment and request network sharing by the second mobile equipment. Then the first mobile equipment can perform network connection to the second mobile equipment that requests network sharing.

It can be understood for those skilled in the art that, the first mobile equipment can automatically start the network sharing function thereof after fetching the sharing instruction directed to the file to be shared. Certainly, after fetching the sharing instruction directed to the file to be shared, the first mobile equipment can also present a page indicating the user to manually turn on the network sharing function, so as to indicate the user to start the network sharing function manually himself. The procedures of manually starting the network sharing function are varied depending on the types of the mobile equipment. For example, in a Samsung mobile phone, the user can select "setting" in the interface, proceed to "wireless and network", and further proceed to "network sharing and portable hot-spot", where "portable WLAN hot-spot" can be turned on.

It is to be noted that, the network sharing function of the first mobile equipment can comprise at least one function of WLAN hot-spot, Bluetooth network sharing and USB network sharing.

Based on the using habits and convenience of user, starting the network sharing function of the first mobile equipment can comprise:

judging whether the WLAN hot-spot function exists, if it does, starting the WLAN hot-spot function; and if it does not, judging whether the Bluetooth network sharing function exists, if it does, starting the Bluetooth network sharing function; and if it does not, starting the USB network sharing function.

It can be understood for those skilled in the art that, the above selecting sequences for different network sharing function are only exemplified, and should not be regarded as a limitation to the embodiments of the invention.

S103, intercepting and redirecting the browser-based network request sent by the second mobile equipment, wherein after the second mobile equipment is in network connection to the first mobile equipment, the user can input any address information in the address bar of the browser of the second mobile equipment. After detecting the address information, the second mobile equipment can generate a network request correspondingly, and send the browser-based network request to the first mobile equipment. The first mobile equipment can fetch and redirect the browser-based network request sent by the second mobile equipment, and then send the file to be shared as the result of the request corresponding to the network request to the second mobile equipment. It can be understood that, the network request can be: a HTTP request or a FTP request, but it is not limited thereto. The any address information can be a network addresses that really exist, such as www.kingsoft.com, kingsoft.com, etc., and can also be a optional character, such as 1, a, etc.

It can be understood for those skilled in the art that, the current user name of the operation system of the first mobile equipment can be the one with administrator authority, and also can be the one without administrator authority. Whether the current user name of operation system of the first mobile equipment is the one with administrator authority or not will result in different way of intercepting and redirecting the browser-based network request sent by the second mobile equipment.

For example, in the case where the current user name of operation system of the first mobile equipment is the one with administrator authority, the browser-based network request sent by the second mobile equipment can be fetched and redirected by means of setting rules of iptables in the operation system of the first mobile equipment, or by means of mounting written kernel module.

It can be understood for those skilled in the art that, for intercepting and redirecting implemented by setting rules of iptables, all the network requests (such as TCP request including HTTP request, FTP request, etc.) of server (such as a first mobile equipment as the sharing end) will be filtered by iptables first at the operation system level, therefore, the rules monitoring the target first port of the browser-based network request of the second mobile equipment and redirecting the browser-based network request sent by the second mobile equipment directed to the first mobile equipment to the preset second port of the first mobile equipment, can be added to the iptables of the first mobile equipment; and for intercepting and redirecting implemented by means of mounting the written kernel module, the kernel module written with netfilter framework can be mounted to the operation system kernel of the first mobile equipment to realize the addition of a hook point to the IP layer of the network architecture, wherein, by using the hook point, the network request of the second mobile equipment directed to the first mobile equipment and targeting the preset first port is intercepted, the target IP in the network request can be changed to the IP address of the first mobile equipment, and the target port can be changed to the preset second port of the first mobile equipment.

Based on above setting modes, the particular procedure of intercepting and redirecting the browser-based network request sent by the second mobile equipment by means of setting rules of iptables in the operation system of the first mobile equipment can be as follow:

monitoring the target first port of the browser-based network request sent by the second mobile equipment, intercepting the browser-based network request sent by the second mobile equipment directed to the first mobile equipment, and then redirecting the intercepted network request to the second port of the first mobile equipment, so as to send the result of the request corresponding to the network request to the second mobile equipment via the second port.

Based on aforementioned setting modes, the particular procedure of intercepting and redirecting the browser-based network request sent by the second mobile equipment by means of mounting the written kernel module can comprise:

intercepting the browser-based network request sent by the second mobile directed to the first mobile equipment and targeting the preset first port by the hook point, changing the target IP address of the network request to IP address of the first mobile equipment, and changing the target port to the second port of the first mobile equipment, so as to send the result of the request corresponding to the network request to the second mobile equipment via the second port.

It can be understood for those skilled in the art that, the target first port can be a 80 port, and the second port can be a port other than 80 port which is capable of sending data content.

It is to be noted that, in the case where the current user name is one without administrator authority, after fetching the sharing instruction directed to file to be shared, the first mobile equipment can present a page that includes the IP address thereof and the access mode, to indicate the user corresponding to the second mobile equipment to input the IP address of the first mobile equipment in the address bar of the browser of the second mobile equipment. Accordingly, the built-in WEB module of the first mobile equipment will automatically respond, so as to obtain the browser-based network request of the second mobile equipment via the built-in module of the first mobile equipment, and then perform subsequent sending step of sharing installation webpage.

It is to be noted that, iptables is an IP information package filtering system integrated on the base of IOS or Linux kernel, wherein, the operation systems currently using Linux kernel comprise: Android, Access Linux, Android, LiMo, Maemo, Mobilinux, Moblin, MotoMagx, Openmoko, WebOS, Qt Extended, Ubuntu Mobile, etc. Moreover, the aforementioned ways of intercepting and redirecting the browser-based network request sent by the second mobile equipment are only exemplified, and should not be regarded as a limitation to the embodiment of the invention.

S104, sending the file to be shared as the result of the request corresponding to the network request to the second mobile equipment, wherein after intercepting and redirecting the browser-based network request sent by the second mobile equipment, the file to be shared can be sent as the result of the request corresponding to the network request to the second mobile equipment via corresponding port. After receiving the file to be shared, the second mobile equipment can save it in a specific storage position or install it in the second mobile equipment under the instruction of the user, thereby completing the file sharing.

It is to be noted that, in the case where the functional software implementing file sharing method is a client software used for providing file sharing function, in order to determine the file to be shared, before sending the file to be shared as the result of the request corresponding to the network request to the second mobile equipment, the method further comprises: presenting a file selection interface for indicating the user to select the file that needs to be shared, wherein the sharable file(s) stored in the first mobile equipment is/are included in the file selection page; and using the file selected by the user and needed to be shared as the file to be shared. It can be understood for those skilled in the art that, the step of determining file to be shared can be just before the step of sending the file to be shared as the result of the request corresponding to the network request to the second mobile equipment. Certainly, for providing the user with user experience of continuous operation, the step of determining file to be shared can be performed immediately after fetching the sharing instruction directed to file to be shared. However, from the perspective of user operation, after the button indicating to share file is clicked by the user, the mobile equipment will present a file selection interface indicating the user to select the file that needs to be shared, so that the user can select the file that needs to be shared.

In this embodiment, there is no need for installing any software or plug-in having file sharing function in the second mobile equipment before sharing file. The first mobile equipment can intercept and redirect the browser-based network request sent by the second mobile equipment, and then send the file to be shared as the result of the request corresponding to the network request to the second mobile equipment, so as to achieve quick file sharing without producing network flow, without the need of installing any software or plug-in having file sharing function in the receiving end of the file to be shared, thereby improving the user experience. Moreover, by using this embodiment, the following effects can be achieved: (1) file transmission can be implemented without mobile network or internet neither for the first mobile equipment used as the sharing end or for the second mobile equipment used as the client end; (2) the operation of one-click is easy, and the user doesn't have to care about how to set or access a hot-spot, or how to obtain relevant files from a sharing end; (3) simultaneous multiuser sharing is supported; (4) a rapid sharing is achieved; (5) it is suitable for the promotion of free software; (6) there is no need for searching the network for installation source; (7) the user does not have to identify whether the installation software is safe, since an installation package present in a sharing end is to obtain; (8) there is no need for a router or AP; (9) there is no need that the shared end and the client end should be in the same network segment; (10) there is no need for using a PC as a transit; (11) there is no need for cable connection; and (12) there is no need for data exchange via a storage card.

It is to be noted that, since the operation system running in the first mobile equipment may be different from that running in the second mobile equipment, for the same application, the installation packages installed in the first mobile equipment and the second mobile equipment are different. For example, the first mobile equipment runs IOS system (an operation system for hand-hold equipment developed by Apple), while the second mobile equipment runs Android system. In this case, when the file to be shared is an installation package of an application, the first mobile equipment needs an installation package applicable to IOS system, while the second mobile equipment needs an installation package applicable to Android system. Therefore, for the purpose of providing the second mobile equipment with a file applicable to its operation system by the first mobile equipment, the first mobile equipment can store files applicable to different operation systems in advance, and then send the one applicable to the operation system of the second mobile equipment as the file to be shared.

Furthermore, for improving the efficiency of redirecting, intercepting and redirecting the browser-based network request sent by the second mobile equipment can comprise:

intercepting the browser-based network request sent by the second mobile equipment;

judging whether the network request is the preset first network request; and redirecting the network request when it is judged that the network request is the preset first network request.

It is to be noted that, the first network request can be set according to the actual conditions, and it is not limited thereto. When it is judged that the network request is not the preset first network request, the first mobile equipment can download the content corresponding to the network request for the second mobile equipment and feed it back to the second mobile equipment.

Further, the specific second mobile equipment can be selected for file sharing according to actual demand, in which the selection procedure can be made during network connection, or after the network connection. In the case where the selection procedure happens during the network connection, performing the network connection to the second mobile equipment that requests network sharing can comprise:

indicating the user to select a sharable second mobile equipment from the second mobile equipments that request network sharing; and performing network connection to the selected sharable second mobile equipment.

In the case where the selection procedure happens after the network connection, after performing network connection to the second mobile equipment that requests network sharing, the file sharing method further comprises:

indicating the user to select a sharable second mobile equipment from the second mobile equipments in state of network connection;

accordingly, intercepting and redirecting the browser-based network request sent by the second mobile equipment comprises:

intercepting the browser-based network request sent by the second mobile equipment; and judging whether the second mobile equipment is a sharable second mobile equipment, and if it is, redirecting the browser-based network request sent by the second mobile equipment.

It is to be noted that, the selection of the sharable second mobile equipment can be achieved by means of presenting the equipment identification of the second mobile equipment that requests network sharing or the equipment identification of the second mobile equipment which is in state of network connection in the form of a list, and indicating the user to select the equipment identification needed. Certainly, the sharable second mobile equipment can be selected by presenting the second mobile equipment that requests network sharing or the second mobile equipment which is in state of network connection in form of displaying the equipment thumbnail in distribution, and the user can select, via a sliding operation, the second mobile equipment in the direction corresponding to the sliding operation as the sharable second mobile equipment, or select a sharable second mobile equipment by clicking the thumbnail. For example, after receiving a sliding gesture instruction from user A (pointing to the left), the equipment B presented on the left side is the sharable equipment; after receiving a sliding gesture instruction from user A (pointing to the right), the equipment C presented on the right side is the sharable equipment.

Certainly, as a specific embodiment, when performing the network connection to the second mobile equipment, the first mobile equipment can generate a password. The second mobile equipment can access the network of the first mobile equipment after inputting the password and being authenticated by the first mobile equipment, thereby guaranteeing the security of the network connection.

Based on aforementioned method embodiment, the invention further provides a file sharing method for sending a file to be shared when the user chooses to download the file to be shared, by which the user experience is further improved.

Likewise, the file sharing method provided in the embodiment is applicable to a first mobile equipment with network sharing function, wherein, the network sharing function of the first mobile equipment comprises: at least one function of WLAN hot-spot, Bluetooth network sharing and USB network sharing. It can be understood that, in a practical application, the first mobile equipment may be a cell phone, a laptop, a tablet computer, etc.

Moreover, the functional software implementing file sharing method can be a sharing function module built in an application, or exist as a plug-in in an application, or a client software installed in a first mobile equipment for providing file sharing function.

Figure 2:
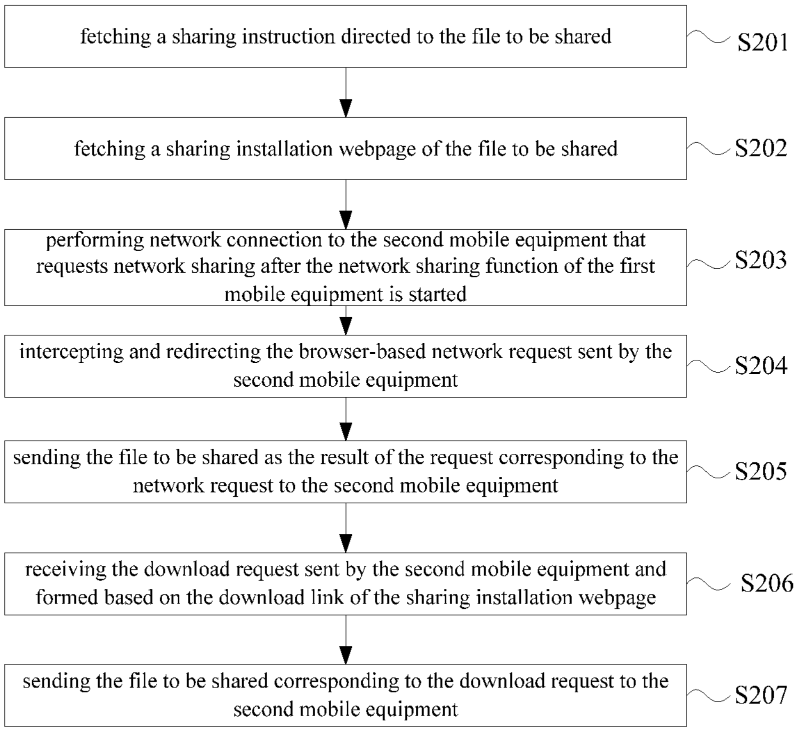
FIG. 2 is the second flow chart of a file sharing method provided in the embodiments of the invention.

As shown in FIG. 2, a file sharing method can comprise:

S201, fetching a sharing instruction directed to the file to be shared;

In the embodiment of the invention, step S201 is similar to step S101 in aforementioned embodiment, the details of which are omitted here.

S202, fetching a sharing installation webpage of the file to be shared, wherein, after the sharing instruction directed to file to be shared is fetched, the sharing installation webpage of the file to be shared can be obtained; and wherein the download link pointing to file to be shared is included in the sharing installation webpage.

It is to be noted that, in the case where the functional software implementing file sharing method is a sharing function module built in an application or exist as a plug-in in a certain application, fetching the sharing installation webpage of the file to be shared can comprise: fetching the installation webpage built in the application in advance. While, in the case where the functional software implementing file sharing method is a client software used for providing file sharing function installed in the first mobile equipment, since the selection range of the file to be shared can be all the files stored in the first mobile equipment, fetching the sharing installation webpage of the file to be shared can comprise: presenting a file selection interface for indicating the user to select the file that needs to be shared, wherein the sharable files stored in the first mobile equipment are included in the file selection page; and using the file selected by the user and needed to be shared as the file to be shared, and generating installation webpage directed to the file to be shared.

Further, it is to be noted that, the step of fetching the sharing installation webpage of the file to be shared can be performed immediately after fetching the sharing instruction directed to file to be shared, but it is not limited thereto, as long as it is ensured that the fetching is done before sending the sharing installation webpage to the second mobile equipment. For example, it can be performed after the sequential step of fetching and redirecting the browser-based network request sent by the second mobile equipment, and also can be performed after the sequential step of starting the network sharing function of the first mobile equipment.

Certainly, in the case where the functional software implementing file sharing method is a client software installed in a first mobile equipment for providing file sharing function, the step of fetching the sharing installation webpage of the file to be shared can be performed immediately after the step of fetching the sharing instruction directed to file to be shared, and from the perspective of user operation, after the user clicks the button used for indicating to share file, the mobile equipment will present a file selection interface for indicating the user to select file that needs to be shared, so that the user can select the file that needs to be shared, thereby providing the user with user experience of continuous operation.

S203, performing network connection to the second mobile equipment that requests network sharing after the network sharing function of the first mobile equipment is started;

S204, intercepting and redirecting the browser-based network request sent by the second mobile equipment;

In the embodiment of the invention, step S203 to step S204 are similar to step S102 to step S103 in aforementioned embodiment, the details of which are omitted here.

S205, sending the file to be shared as the result of the request corresponding to the network request to the second mobile equipment, wherein after fetching and redirecting the browser-based network request sent by the second mobile equipment is completed, the sharing installation webpage can be sent as the result of the request corresponding to the network request to the second mobile equipment via corresponding port, thereby the second mobile equipment can receive and present the sharing installation webpage.

S206, receiving the download request sent by the second mobile equipment and formed based on the download link of the sharing installation webpage, wherein after the received sharing installation webpage is presented in the second mobile equipment, the user can click the download link in the sharing installation webpage. After the operation of clicking the download link is detected, the second mobile equipment generates a download request corresponding to the download link and sends it to the first mobile equipment. The first mobile equipment can receive the download request that is sent by the second mobile equipment and formed based on the download link of the sharing installation webpage, and then perform the subsequent sending of the file to be shared.

It can be understood for those skilled in the art that, when the download request that is sent by the second mobile equipment and formed based on the download link of the sharing installation webpage is not received in a preset period of time, it means that the user of the second mobile equipment chooses not to approve the downloading of the file to be shared. Then, the first mobile equipment downloads the content corresponding to the network request for the second mobile equipment from network, and feeds it back to the second mobile equipment.

S207, sending the file to be shared corresponding to the download request to the second mobile equipment.

After receiving the download request sent by the second mobile equipment via the download link of the sharing installation webpage, the file to be shared corresponding to the download request can be sent to the second mobile equipment. After receiving the file to be shared, the second mobile equipment can save it in a specific storage position or install it in the second mobile equipment under the indication of the user, thereby achieving the sharing of the file in the first mobile equipment with the second mobile equipment.

In this embodiment, there is no need to install any plug-in or software having file sharing function in the second mobile equipment before sharing file. The first mobile equipment can intercept and redirect the browser-based network request sent by the second mobile equipment, and then send the sharing installation webpage as the result of the request corresponding to the network request to the second mobile equipment. After receiving the download request that is sent by the second mobile equipment and formed based on the download link of the sharing installation webpage, the first mobile equipment can send the file to be shared corresponding to the download request to the second mobile equipment. Thereby, a quick file sharing is achieved without producing any network flow, without installing any software or plug-in having file sharing function in the receiving end of the file to be shared, and the file to be shared can be sent when the user needs the file to be shared, thereby further improving the user experience.

It is to be noted that, the operation system running in the first mobile equipment may be different from that running in the second mobile equipment. Therefore, for the same application, the installation packages to be installed in them are different. For example, the first mobile equipment runs an IOS system (an operation system for hand-hold equipment developed by Apple), while the second mobile equipment runs an Android system. In the case where the file to be shared is an installation package of an application, the first mobile equipment needs an installation package applicable to IOS system, while the second mobile equipment needs an installation package applicable to Android system. Therefore, for the purpose of providing the second mobile equipment with a file applicable to the operation system of the second mobile equipment by the first mobile equipment, the first mobile equipment can store files applicable to different operation systems in advance, and provide download links corresponding to different operation systems in the sharing installation webpage.

For example, a file to be shared can correspond to a sharing installation webpage, wherein, the sharing installation webpage comprises the download link that is directed to at least one operation system and points to the file to be shared, and each download link points to the file to be shared that is directed to one operation system;

accordingly, sending the file to be shared corresponding to the download request to the second mobile equipment can comprise:

according to the download request, determining the first operation system running in the second mobile equipment; and sending the file to be shared corresponding to the download request to the second mobile equipment and directed to the first operation system.

For example, a file to be shared corresponds to at least one sharing installation webpage, wherein each sharing installation webpage comprises the download link that points to file to be shared and is directed to one operation system;

accordingly, sending the file to be shared as the result of the request corresponding to the network request to the second mobile equipment can comprise:

according to the network request, determining the first operation system running in the second mobile equipment; and sending the sharing installation webpage corresponding to the first operation system as the result of the request corresponding to the network request to the second mobile equipment.

Further, for improving the efficiency of redirecting, intercepting and redirecting the browser-based network request sent by the second mobile equipment can comprise:

intercepting the browser-based network request sent by the second mobile equipment;

judging whether the network request is the preset first network request; and redirecting the network request when it is judged that the network request is the preset first network request.

The first network request can be set according to the actual conditions, and it is not limited. It is to be noted that the first network request can be set according to the actual conditions, and it is not limited. Further, when it is determined that the network request is not the preset first network request, the first mobile equipment can download the content corresponding to the network request for the second mobile equipment from a network and feed it back to the second mobile equipment.

Further, the specific second mobile equipment can be selected for file sharing according to actual requirements. The selection procedure can be made during the network connection, or after the network connection. In the case where the selection procedure happens during the network connection, the network connection to the second mobile equipment that requests network sharing can comprise:

indicating the user to select a sharable second mobile equipment from the second mobile equipments that request network sharing; and performing the network connection to the selected sharable second mobile equipment.

In the case where the selection procedure happens after the network connection, after performing the network connection to the second mobile equipment that requests network sharing, the file sharing method further comprises:

indicating the user to select the sharable second mobile equipment from the second mobile equipments in the state of network connection;

accordingly, intercepting and redirecting the browser-based network request sent by the second mobile equipment comprises:

intercepting the browser-based network request sent by the second mobile equipment; and judging whether the second mobile equipment is a sharable second mobile equipment, and if it is, redirecting the browser-based network request sent by the second mobile equipment.

It is to be noted that, the selection of the sharable second mobile equipment can be achieved by presenting the equipment identification of the second mobile equipment that requests network sharing or the equipment identification of the second mobile equipment which is in the state of network connection in the form of a list, and indicating the user to select the equipment identification needed. Certainly, the sharable second mobile equipment can be selected by presenting the second mobile equipment that requests network sharing or the second mobile equipment which is in the state of network connection in the form of displaying the equipment thumbnail in distribution, and the user can use, via a sliding operation, the second mobile equipment on the direction corresponding to the sliding operation as the sharable second mobile equipment, or select sharable second mobile equipment by clicking the thumbnail. For example, after receiving the sliding gesture instruction of user A (pointing to the left), the equipment B presented on the left side is the sharable equipment; after receiving the sliding gesture instruction of user A (pointing to the right), the equipment C presented on the right side is the sharable equipment.

Certainly, as a specific embodiment, when the first mobile equipment is performing the network connection to second mobile equipment, the first mobile equipment can generate a password. The second mobile equipment can access the network of the first mobile equipment after inputting the password and being authenticated by the first mobile equipment, thereby guaranteeing the security of the network connection.

A file sharing method provided in the embodiment of the invention is described below in combination with a specific application embodiment.

It is to be noted that, the functional software implementing the file sharing method is a sharing function module built in application 1, wherein phone A has the function of WLAN hot-spot and the administrator authority.

Figure 3:
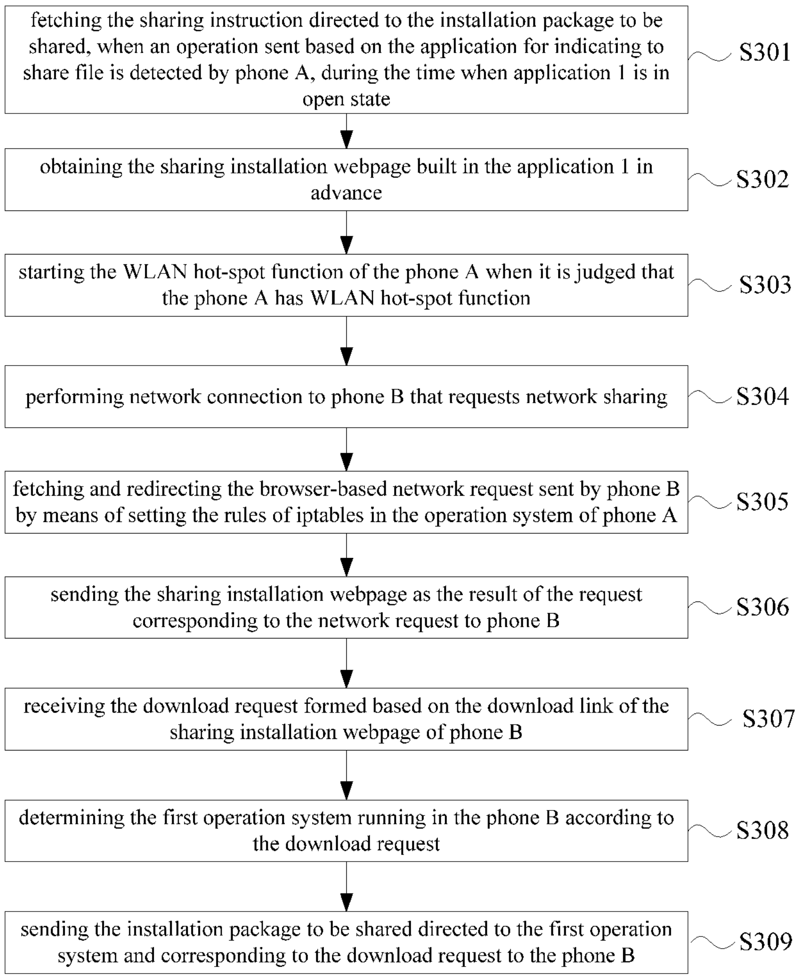
FIG. 3 is the third flow chart of a file sharing method provided in the embodiments of the invention.

As shown in FIG. 3, a file sharing method can comprise:

S301, fetching the sharing instruction directed to the installation package to be shared, when an operation sent based on the application for indicating to share file is detected by phone A, during the time when application 1 is in open state, wherein when the installation package of application 1 is needed to be shared to another equipment, the user can click the button of "one-touch sharing" displayed in a page of application 1, so that phone A can fetch the sharing instruction directed to the installation package to be shared, wherein the installation package to be shared is the installation package corresponding to application 1.

S302, obtaining the sharing installation webpage built in the application 1 in advance;

Wherein, after fetching the sharing instruction directed to installation package to be shared, the sharing installation webpage built in application 1 in advance can be obtained, wherein the sharing installation webpage includes the download link which points to installation package to be shared and directed to at least one operation system.

S303, starting the WLAN hot-spot function of the phone A when it is judged that the phone A has WLAN hot-spot function;

S304, performing network connection to phone B that requests network sharing, wherein after phone A starting the function of WLAN hot-spot, phone B can scan phone A and request a network sharing, so that phone A can perform network connection to phone B that requests network sharing. If a verification password is set when phone A starts the function of WLAN hot-spot, it is needed for phone B to input the verification password when requesting network sharing, and phone A can connect to phone B when the verification password is correct.

S305, fetching and redirecting the browser-based network request sent by phone B by means of setting the rules of iptables in the operation system of the phone A;

S306, sending the sharing installation webpage as the result of the request corresponding to the network request to phone B, wherein after phone A is in network connection to phone B, the user can input any address information in the address bar of the browser of phone B, and after detecting the address information, phone B can generate corresponding network request and send the generated browser-based network request to phone A; by means of setting rules of iptables in the operation system of phone A, the phone A can intercept and redirect the browser-based network request sent by phone B, and then send the sharing installation webpage as the result of the request corresponding to the network request to the phone B. It can be understood that the network request can be: HTTP request or FTP request, but it is not limited thereto.

S307, receiving the download request formed based on the download link of the sharing installation webpage of phone B;

S308, determining the first operation system running in the phone B according to the download request; and S309, sending the installation package to be shared directed to the first operation system and corresponding to the download request to the phone B.

When the received sharing installation webpage is presented in phone B, the user can click the download link applicable to the first operation system running in phone B in the sharing installation webpage. After detecting the operation of clicking the download link, the phone B generates the download request corresponding to the download link and sends it to the phone A. Phone A can receive the download request that is sent by the phone B and formed based on the sharing installation webpage, and determine the first operation system running in the phone B according to the download request, and then send the installation package to be shared corresponding to the download request and directed to the first operation system to phone B. After receiving installation package to be shared, phone B can save it in specific position or install it in the phone B under the instruction of the user, thereby achieving file sharing.

It can be seen that, in this embodiment, a quick file sharing can be achieved without producing network flow, without the need of installing any software or plug-in having file sharing function in the receiving end of the file to be shared. The file to be shared is sent when the user need it, thereby further improving the user experience.

A file sharing method provided in the embodiment of the invention is described below in combination with another specific application embodiment.

It is to be noted that, the functional software implementing the file sharing method is a client software that is installed in phone A and used for file sharing, wherein the phone A has the function of WLAN hot-spot and the administrator authority.

Figure 4:
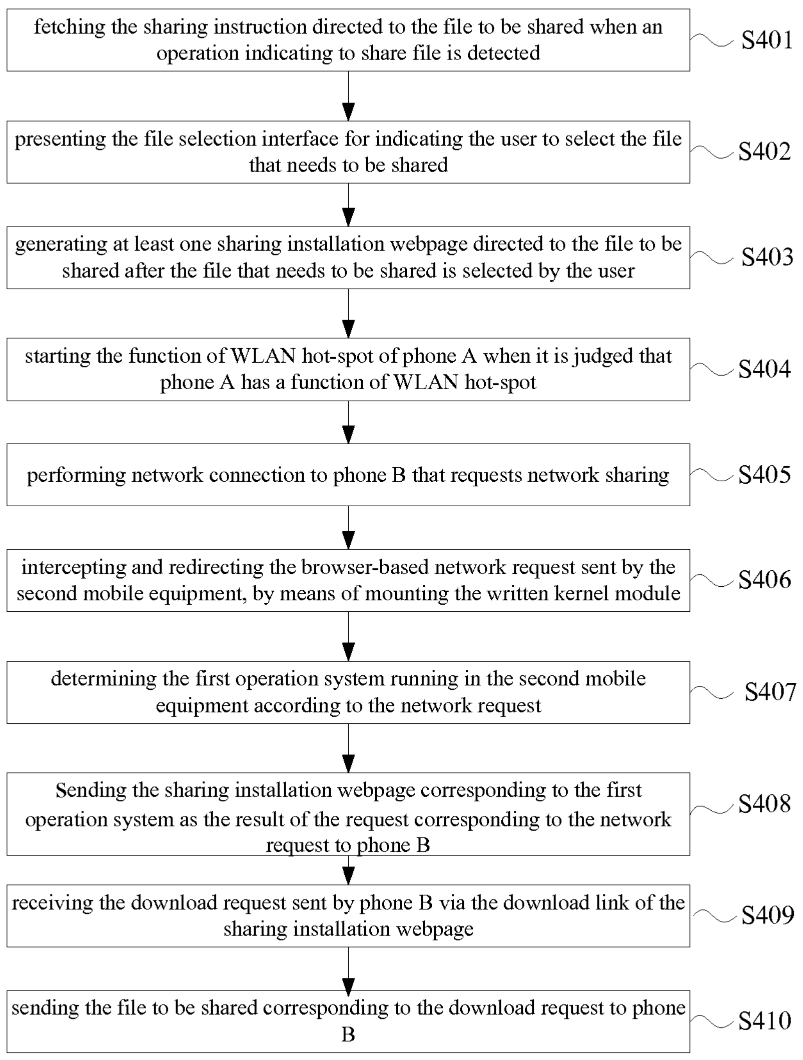
FIG. 4 is the fourth flow chart of a file sharing method provided in the embodiments of the invention.

As shown in FIG. 4, a file sharing method can comprise:

S401, fetching the sharing instruction directed to the file to be shared when an operation indicating to share file is detected, wherein when a file stored in phone A is needed to be shared to another equipment, after the button of "one-touch sharing" in the client software used for sharing file is clicked by the user, the phone A fetches the sharing instruction directed to file to be shared;

S402, presenting the file selection interface for indicating the user to select the file that needs to be shared, wherein the sharable file(s) stored in the phone A is/are included in the file selection page;

S403, generating at least one sharing installation webpage directed to the file to be shared after the file that needs to be shared is selected by the user, wherein, each sharing installation webpage comprises the download link pointing to the file to be shared and directed to one operation system;

S404, starting the function of WLAN hot-spot of phone A when it is judged that phone A has a function of WLAN hot-spot;

S405, performing network connection to phone B that requests network sharing, wherein after phone A starting the function of WLAN hot-spot, phone B can scan the phone A and request network sharing, and phone A can perform network connection to phone B that requests network sharing. If a verification password is set when phone A starts the function of WLAN hot-spot, it is needed for phone B to input the verification password when requesting network sharing, and phone A can connect to phone B when the verification password is correct;

S406, intercepting and redirecting the browser-based network request sent by the second mobile equipment, by means of mounting the written kernel module;

S407, determining the first operation system running in the second mobile equipment according to the network request;

S408, sending the sharing installation webpage corresponding to the first operation system as the result of the request corresponding to the network request to phone B, wherein, after phone A is in network connection to phone B, the user can input any address information in the address bar of the browser of phone B; after detecting the address information, phone B can generate corresponding network request, and send the generated browser-based network request to the phone A; by means of mounting the written kernel module, the phone A can intercept and redirect the browser-based network request sent by the phone B, determine the first operation system running in the second mobile equipment, and then send the sharing installation webpage as the result of the request corresponding to the network request to the phone B. It can be understood that the network request can be: HTTP request or FTP request, but it is not limited thereto;

S409, receiving the download request sent by phone B via the download link of the sharing installation webpage; and

S410, sending the file to be shared corresponding to the download request to phone B.

When the received sharing installation webpage is presented in phone B, the user can click the download link in the sharing installation webpage. After detecting the operation of clicking the download link, the phone B generates the download request corresponding to the download link and sends it to the phone A. Phone A can receive the download request sent by the phone B and formed based on the download link of the sharing installation webpage, and then send the file to be shared corresponding to the download request to the phone B. After receiving the installation package to be shared, phone B can save it in a specific position or install it in the phone B under the instruction of the user, thereby achieving file sharing.

It can be seen that, by using this embodiment, a quick file sharing can be achieved without producing network flow, without the need of installing any software or plug-in having file sharing function in the receiving end of the file to be shared. The shared file is sent when the user need it, thereby further improving the user experience.

A file sharing device corresponding to the method embodiment corresponding to aforementioned shared end is provided in the invention, which is applicable to a first mobile equipment.

Figure 5:
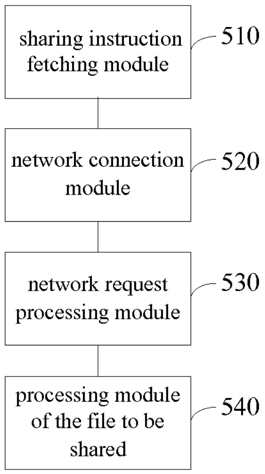
FIG. 5 is the structure diagram of a file sharing device provided in the embodiments of the invention.

Embodiment 1, as shown in FIG. 5, the file sharing device can comprise:

a sharing instruction fetching module 510, which is used to fetch the sharing instruction directed to a file to be shared;

a network connection module 520, which is used to perform the network connection to the second mobile equipment that requests network sharing after the network sharing function of the first mobile equipment is started; and a network request processing module 530, which is used to intercept and redirect the browser-based network request sent by the second mobile equipment;

a processing module of the file to be shared 540, which is used to send the file to be shared as the result of the request corresponding to the network request to the second mobile equipment;

In this embodiment, there is no need to install any software or plug-in having file sharing function in the second mobile equipment before sharing file. The first equipment can intercept and redirect the network request sent by the second mobile equipment, and then send the file to be shared to the second mobile equipment as the result of the request corresponding to the network request. Thereby, a quick file sharing without producing network flow is achieved, without the need of installing any software or plug-in having file sharing function in the receiving end of the file to be shared, thereby improving the user experience.

Based on the file sharing device provided in embodiment 1 of the invention, the file sharing device provided in embodiment 2 of the invention can comprise: a network sharing function starting module, which is used to start the network sharing function of the first mobile equipment before performing the network connection to the second mobile equipment that requests network sharing.

According to the file sharing device provided in embodiment 1 or 2, the sharing instruction fetching module 510 can comprise:

a first sharing instruction fetching unit, which is used to fetch the sharing instruction directed to the file to be shared when the operation sent based on the application and used for indicating to share file is detected during the time when the application is in open state, wherein the file to be shared is the one corresponding to the application.

According to the file sharing device provided in embodiment 1 or 2, the sharing instruction fetching module 510 can comprise:

a second sharing instruction fetching unit, which is used to fetch the sharing instruction directed to the file to be shared when the operation indicating to share file is detected.

The device can further comprise:

a determining module of the file to be shared, which is used to present a file selection interface indicating the user to select the file that needs to be shared before sending the file to be shard as the result of the request corresponding to the network request to the second mobile equipment, wherein the sharable file(s) stored in the first mobile equipment is/are included in the file selection interface; and the file selected by the user and needed to be shared is used as the file to be shared.

Further, based on the embodiment 1 or 2, the file sharing device provided in embodiment 3 of the invention can further comprise:

an sharing installation webpage fetching module, which is used to fetch the sharing installation webpage of the file to be shared after fetching the sharing instruction directed to file to be shared, wherein the download link pointing to the file to be shared is included in the sharing installation webpage;

accordingly, the processing module of the file to be shared 540 can comprise:

a sharing installation webpage sending unit, which is used to send the sharing installation webpage as the result of the request corresponding to the network request to the second mobile equipment; and a processing unit of the file to be shared, which is used to send the file to be shared corresponding to the download request to the second mobile equipment after receiving the download request sent by the second mobile equipment and formed based on the download link of the sharing installation webpage.

According to the file sharing device provided in embodiment 3, the sharing instruction fetching module can comprise:

a first sharing instruction fetching unit, which is used to fetch the sharing instruction directed to file to be shared when the operation indicating to share file sent based on the application is detected during the time when the application is in open state, wherein the file to be shared is the file corresponding to the application;

accordingly, the sharing installation webpage fetching unit can comprise:

a first sharing installation webpage fetching unit, which is used to fetch the sharing installation webpage built in the application in advance after fetching the sharing instruction directed to the file to be shared, wherein the download link pointing to the file to be shared is included in the sharing installation webpage.

According to the file sharing device provided in embodiment 3, the sharing instruction fetching module 510 can comprise:

a second sharing instruction fetching unit, which is used to fetch the sharing instruction directed to the file to be shared when the operation indicating to share file is detected;

accordingly, the sharing installation webpage fetching module can comprise:

a second sharing installation webpage fetching unit, which is used to present the file selection interface for indicating the user to select file to be shared after fetching the sharing instruction directed to the file to be shared, wherein the sharable file(s) stored in the first mobile equipment is/are included in the file selection interface; and generate the sharing installation webpage directed to the file to be shared after the file to be shared is selected, wherein the download link pointing to the file to be shared is included in the sharing installation webpage.

For the file sharing device provided in embodiment 1, 2 or 3, the network request processing module 530 can comprise:

a network request intercepting unit, which is used to intercept the browser-based network request sent by the second mobile equipment;

a judging unit, which is used to judge whether the network request is the preset first network request; and a network request redirecting unit, which is used to redirect the network request when it is judged that the network request is the preset first network request.

For the file sharing device provided in embodiment 1, embodiment 2 or 3, the network request processing module 530 is used to intercept and redirect the browser-based network request sent by the second mobile equipment by means of setting rules of iptables in the operation system of the first mobile equipment, when the current user name of operation system of the first mobile equipment is the one with administrator authority.

For the file sharing device provided in embodiment 1, embodiment 2 or 3, the network request processing module 530 can intercept and redirect the browser-based network request sent by the second mobile equipment by means of mounting the written kernel module.

The file sharing device provided in embodiment 1, 2 or 3 can further comprise:

a webpage presenting module, which is used to present a webpage that includes the IP address and the access method of the first mobile equipment itself after fetching the sharing instruction directed to the file to be shared, so as to indicate the user corresponding to the second mobile equipment to input the IP address of the first mobile equipment in the address bar of the browser of the second mobile equipment;

the network request processing module 530 is used to obtain the browser-based network request of the second mobile equipment via the built-in WEB module in the first mobile equipment, when the current user name of operation system of the first mobile equipment is the one without administrator authority.

For the file sharing device provided in embodiment 1, 2 or 3, the network connection module 520 can comprise:

a selection unit, which is used to indicate the user to select a sharable second mobile equipment from the second mobile equipments that request network sharing; and a network connection unit, which is used to perform the network connection to the selected sharable second mobile equipment.

Further, the file sharing device provided in embodiment 1, 2 or 3 can further comprise:

a selection module, which is used to indicate the user to select a sharable second mobile equipment from the second mobile equipments that are in the state of network connection after performing the network connection to the second mobile equipment that requests network sharing;

the network request processing module 530 can comprise:

a network request intercepting unit, which is used to intercept the browser-based network request sent by the second mobile equipment; and a network request processing unit, which is used to judge whether the second mobile equipment is a sharable second mobile equipment, and if it is, redirect the browser-based network request sent by the second mobile equipment.

For the file sharing device provided in embodiment 2, the network sharing function of the first mobile equipment comprises at least one function of WLAN hot-spot, Bluetooth network sharing and USB network sharing.

The network sharing function starting module is used to determine whether the function of WLAN hot-spot exists, if it does, start the function of WLAN hot-spot; and if it does not, judge whether the function of Bluetooth network sharing exists, if it does, start the function of Bluetooth network sharing; and if it does not, start the function of USB network sharing.

For the file sharing device provided in embodiment 3, the file to be shared corresponds to a sharing installation webpage, wherein, the sharing installation webpage comprises a download link pointing to file to be shared and directed to at least one operation system, and each download link points to a file to be shared directed to one operation system;

the processing module of the file to be shared can comprise:

an operation system determining subunit, which is used to determine the first operation system running in the second mobile equipment after receiving the download request sent by the second mobile equipment via the download link of the sharing installation webpage according to the download request; and a sending subunit of the file to be shared, which is used to send the file to be shared corresponding to the download request and directed to the first operation system to the second mobile equipment;

or, the file to be shared corresponds to at least one sharing installation webpage, wherein each sharing installation webpage comprises the download link that points to the file to be shared and directed to one operation system;

the sharing installation webpage sending unit can comprise:

an operation system determining subunit, which is used to determine the first operation system running in the second mobile equipment according to the network request; and a sending subunit of sharing installation webpage, which is used to send the sharing installation webpage corresponding to the first operation system as the result of the request corresponding to the network request to the second mobile equipment.

Further, the invention also provides mobile equipment, which is a first mobile equipment, and can comprise: any one of the file sharing device which is provided in the invention and applicable to the first mobile equipment.

For the system embodiments, since it is similar to method embodiments, it is described briefly, and the related part can refer to the part of method embodiments.

It is to be noted that, in this context, the relational terms such as first and second are only used to differentiate one entity or operation from another, not necessarily requiring or suggesting any these actual relations or sequences existed among these entities or operations. Moreover, terms "comprise", "include" or any other variants thereof are intended to cover including not exclusively, and thereby enable that the procedure, method, article or equipment that comprise a series of factors not only comprise those factors, but also comprise other factors which are not explicitly listed, or further comprise factors inherent in the procedure, method, article or equipment. Without other limitation, the factor defined by the term of "comprise a(an) . . . " don't exclude the case where other same factors also exist in the procedure, method, article or equipment that comprise the mentioned factor.

It can be understood for those skilled in the art that, all the steps of the aforementioned modes of execution or parts of them can be realized by a procedure to instruct relevant hardware to complete, wherein the procedure can be saved in the computer readable storage medium. The storage medium herein is, for example, ROM/RAM, magnetic disk, optical disk, etc.

What mentioned above is only the preferred embodiments of the invention, and is not used to limit the scope of protection of the invention. Any changes, equivalent replacements, improvements and so forth within the scope and spirit of the invention, are all included within the scope of protection of the invention.

The invention claimed is:

1. A file sharing method, applicable to a first mobile equipment, comprising:

fetching a sharing instruction directed to a file to be shared;

after starting a network sharing function of the first mobile equipment, performing a network connection to a second mobile equipment that requests network sharing such that a direct connection is established through the network sharing function between the first mobile equipment and the second mobile equipment; and intercepting and redirecting a browser-based network request sent by the second mobile equipment, and sending, via the direct connection, the file to be shared as the result of the request corresponding to the browser-based network request to the second mobile equipment, wherein, the browser-based network request sent by the second mobile equipment is generated by the second mobile equipment after detecting any address information that is input by a user in an address bar of a browser of the second mobile equipment sufficient to cause the second mobile equipment to make a network request, and wherein intercepting and redirecting the browser-based network request sent by the second mobile equipment is realized by means of setting rules of iptables in the operation system of the first mobile equipment when the current user name of the operation system of the first mobile equipment is the one with administrator authority.

2. The method according to claim 1, wherein, before performing the network connection to the second mobile equipment that requests network sharing, the method further comprises: starting the network sharing function of the first mobile equipment.

3. The method according to claim 1, wherein in fetching the sharing instruction directed to the file to be shared when an operation sent based on an application indicating to share file is detected during the time when the application is in open state, the file to be shared is a file corresponding to the application.

4. The method according to claim 1, wherein in fetching the sharing instruction directed to the file to be shared when an operation indicating to share file is detected; and before sending the file to be shared as the result of the request corresponding to the browser-based network request to the second mobile equipment, the method further comprises:

presenting a file selection interface for indicating the user to select the file that needs to be shared, wherein the sharable files stored in the first mobile equipment are included in a file selection page; and using the file selected by user and needed to be shared as the file to be shared.

5. The method according to claim 1, wherein, after fetching the sharing instruction directed to the file to be shared, the method further comprises:

fetching the sharing installation webpage of the file to be shared, wherein the download link directed to the file to be shared is included in the sharing installation webpage; accordingly, sending the file to be shared as the result of the request corresponding to the browser-based network request to the second mobile equipment comprises:

sending the sharing installation webpage as the result of the request corresponding to the browser-based network request to the second mobile equipment; and after receiving the download request sent by the second mobile equipment and formed based on the download link of the sharing installation webpage, sending the file to be shared corresponding to the download request to the second mobile equipment.

6. The method according to claim 1, wherein intercepting and redirecting the browser-based network request sent by second mobile equipment comprises:

intercepting the browser-based network request sent by the second mobile equipment; judging whether the browser-based network request is the preset first network request; and redirecting the browser-based network request when it is judged that the browser-based network request is the preset first network request.

7. The method according to claim 1, wherein intercepting and redirecting the browser-based network request sent by the second mobile equipment is realized by means of mounting a written kernel module when the current user name of operation system of the first mobile equipment is the one with administrator authority.

8. The method according to claim 1, wherein, when a current user name of operation system of the first mobile equipment is the one without administrator authority, further comprising:

after fetching the sharing instruction directed to the file to be shared, presenting a page that includes the IP address and the access method of the first mobile equipment itself, to indicate the user corresponding to the second mobile equipment to input the IP address of the first mobile equipment in the address bar of the browser of the second mobile equipment; and accordingly, intercepting and redirecting the browser-based network request sent by the second mobile equipment comprising: fetching the browser-based network request of the second mobile equipment via a WEB module built in the first mobile equipment.

9. The method according to claim 1, wherein performing the network connection to the second mobile equipment which requests network sharing comprises: indicating the user to select a sharable second mobile equipment from the second mobile equipment that request network sharing; and performing a network connection to the selected sharable second mobile equipment.

10. A device for sharing a file applicable to a first mobile equipment, the device comprising:

a processor, a memory, a communication interface and a bus;

wherein the processor, the memory and the communication interface are connected to one another via the bus and communicate with each other;

wherein the memory stores executable program codes;

wherein the processor runs a program corresponding to the executable program codes by reading the executable program codes stored in the memory for:

fetching a sharing instruction directed to a file to be shared;

performing a network connection to a second mobile equipment that requests network sharing after a network sharing function of the first mobile equipment is started such that a direct connection is established through the network sharing function between the first mobile equipment and the second mobile equipment;

intercepting and redirecting a browser-based network request sent by the second mobile equipment; and sending, via the direct connection, the file to be shared as the result of the request corresponding to the browser-based network request to the second mobile equipment;

wherein, the browser-based network request sent by the second mobile equipment is generated by the second mobile equipment after detecting any address information that is input by a user in an address bar of a browser of the second mobile equipment sufficient to cause the second mobile equipment to make a network request, and wherein intercepting and redirecting the browser-based network request sent by the second mobile equipment is realized by means of setting rules of iptables in the operation system of the first mobile equipment when the current user name of the operation system of the first mobile equipment is the one with administrator authority.

11. The device according to claim 10, wherein the processor runs the program corresponding to the executable program codes by reading the executable program codes stored in the memory further for:

starting the network sharing function of the first mobile equipment before performing the network connection to the second mobile equipment that requests the network connection.

12. The device according to claim 10, wherein in fetching the sharing instruction directed to the file to be shared when an operation sent based on an application indicating to share file is detected during the time when the application is in open state, the file to be shared is the one corresponding to the application.

13. The device according to claim 10, wherein in fetching the sharing instruction directed to the file to be shared when an operation indicating to share file is detected; presenting a file selection interface for indicating the user to select the file that needs to be shared before sending the file to be shared as the result of the request corresponding to the browser-based network request to the second mobile equipment, wherein the sharable file(s) stored in the first mobile equipment is/are included in the file selection interface.

14. The device according to claim 10, after fetching the sharing instruction directed to the file to be shared, the processor runs the program corresponding to the executable program codes by reading the executable program codes stored in the memory further for fetching the sharing installation webpage of the file to be shared, wherein a download link pointing to the file to be shared is included in the sharing installation webpage;

accordingly, sending the sharing installation webpage as the result of the request corresponding to the browser-based network request to the second mobile equipment; and sending the file to be shared corresponding to the download request to the second mobile equipment after receiving the download request sent by the second mobile equipment and formed based on the download link of the sharing installation webpage.

15. The device according to claim 10, wherein intercepting and redirecting the browser-based network request sent by second mobile equipment comprises:

intercepting the browser-based network request sent by the second mobile equipment;

judging whether the browser-based network request is the preset first network request; and redirecting the browser-based network request when it is determined that the browser-based network request is the preset first network request.

16. The device according to claim 10, wherein, intercepting and redirecting the browser-based network request sent by the second mobile equipment is realized by mounting a written kernel module when the current user name of operation system of the first mobile equipment is the one with administrator authority.

17. The device according to claim 10, wherein, when a current user name of an operation system of the first mobile equipment is the one without administrator authority, the processor runs the program corresponding to the executable program codes by reading the executable program codes stored in the memory further for:

presenting a webpage that includes the IP address and the access method of the first mobile equipment itself after fetching the sharing instruction directed to the file to be shared, so as to indicate the user corresponding to the second mobile equipment to input the IP address of the first mobile equipment in the address bar of the browser of the second mobile equipment; and obtaining the browser-based network request of the second mobile equipment via a WEB module built in the first mobile equipment.

18. A mobile equipment comprising a device for file sharing according to claim 10.

* * * * *